United States Patent [19]

Hendy et al.

[11] 4,212,908
[45] Jul. 15, 1980

[54] APPARATUS AND METHOD FOR PRODUCING COATED FILM

[75] Inventors: Brian N. Hendy, Welwyn, England; John M. Ford, Dumfries, Scotland

[73] Assignee: Imperical Chemical Industries Limited, London, England

[21] Appl. No.: 958,937

[22] Filed: Nov. 6, 1978

[30] Foreign Application Priority Data

Nov. 28, 1977 [GB] United Kingdom ............... 49346/77

[51] Int. Cl.² ............................................. B05D 3/12
[52] U.S. Cl. ........................... 427/355; 118/DIG. 11; 118/125; 425/71; 425/72 R; 425/90; 425/92; 425/384; 427/358; 427/401
[58] Field of Search ....................... 118/DIG. 11, 125; 425/71, 72 R, 90, 92, 384; 427/355, 401, 358

[56] References Cited

U.S. PATENT DOCUMENTS

| 3,068,516 | 12/1962 | Hofer ................................ 118/125 X |
| 3,819,776 | 6/1974 | Robinson et al. .................. 425/71 X |

Primary Examiner—Michael R. Lusignan
Attorney, Agent, or Firm—Cushman, Darby & Cushman

[57] ABSTRACT

The invention relates to apparatus and a method for producing a coated film in which a cooled polymeric tubular extrudate is coated, reheated and inflated to yield an oriented, coated tubular film. The apparatus includes a coating head comprising a rotatable assembly including a support member [13] providing an orifice [14] through which the tubular extrudate may be fed, a plurality of spreading members [19] spaced-apart around the orifice, mounting means [15] for each of the spreading members operatively associated with the support member and displaceable relative thereto, and means [21] for biasing each of the spreading members into engagement with the tubular extrudate. Liquid coating medium is suitably deposited on the extrudate from a spray assembly, and the coating asembly is rotated around the extrudate thereby spreading and polishing the deposited medium to yield a uniformly coated film. The system is particularly suitable for the production of polymeric packaging films having an antistatic coating on the surface thereof.

10 Claims, 6 Drawing Figures

APPARATUS AND METHOD FOR PRODUCING COATED FILM

CROSS REFERENCE TO RELATED APPLICATIONS

This application is related to commonly assigned application Ser. No. 799,158, filed May 23, 1977, now U.S. Pat. No. 4,165,956 patented Aug. 28, 1979.

BACKGROUND AND SUMMARY OF THE INVENTION

This invention relates to coated films, and, in particular, to an apparatus and method for producing a coated tubular film.

Films are coated for a variety of reasons, for example—to improve gas-barrier characteristics or to confer heat-sealing properties on a surface of a relatively inert film. Such coatings are usually applied by depositing a coating material in flowable condition, for example—as a melt, or as a solution or dispersion of the coating material in a liquid vehicle, on to a surface of the film, and spreading the deposited coating material over that surface by means of an appropriately positioned cooperating spreading member. The deposited coating may be spread directly on the surface of a tubular film-forming extrudate by a stationary annular spreading member, suitably in the shape of a closely fitting, abrasive-filled, resilient collar encircling the extrudate. Alternatively, a tubular film may first be collapsed to the lay-flat state, and the deposited coating spread by means of at least one flat member, such as a bar or roller, engaging each of the opposed surfaces of the collapsed tube. The hitherto practised techniques thus generally involve longitudinal axial movement of the tubular substrate relative to the spreading member, so that the deposited coating material is spread longitudinally on a surface thereof, and, in practice, have proved difficult to operate to yield consistently uniform, high quality coatings.

A recently developed technique for coating an axially moving tubular form involves depositing a coating medium on a surface of the form, and spreading the deposited medium around at least part of the surface in a direction transverse to the direction of movement of the form. Transverse spreading is effected by means of an endless belt cooperating with the external surface of the form. However, a single belt assembly can effectively spread the coating medium around only part of the form surface, and complete coverage of the form surface entails the use of a plurality of independently activated belts axially spaced-apart along the length of the form.

We have now devised a simplified and reliable transverse coating system capable of yielding consistently uniform coatings.

Accordingly, the present invention provides an apparatus for producing a coated film in which a cooled thermoplastic polymeric tubular extrudate is axially forwarded through reheating and inflating means to yield an oriented, coated tubular film characterised by a coating head disposed prior to said reheating means and comprising a rotatable assembly including a support member providing an orifice through which the tubular extrudate may be fed in an axial direction, a plurality of spreading members spaced-apart around the orifice, mounting means for each of the spreading members, said mounting means being operatively associated with the support member and displaceable relative thereto, and means for biasing each of the spreading members inwardly of the support member for engagement with the external surface of the tubular extrudate, and by drive means for rotating the assembly in a plane substantially normal to said axial direction.

The invention further provides a method of producing a coated film by depositing a coating medium on the surface of an axially moving cooled thermoplastic polymeric tubular extrudate and reheating and inflating the coated extrudate to form an oriented, coated tubular film characterised by polishing the deposited coating medium onto the surface of the extrudate by successive contact with each of a plurality of spreading members resiliently biased into engagement with said surface and rotating around the periphery of the extrudate in a plane substantially normal to the longitudinal axis of said tubular extrudate.

Although tubular extrudates of various cross-sectional shapes may be coated, the technique of the present invention is particularly suitable for the coating of a substantially cylindrical extrudate from which an oriented film can be produced on inflation and stretching by a conventional "bubble" film-forming process.

Reference in this specification to movement of the tubular extrudate in an "axial" direction, unless otherwise stated, indicates movement substantially in the direction of the longitudinal axis of the extrudate, and includes movement in a direction slightly inclined to said longitudinal axis, to accommodate the sway or wander normally experienced in conventional processes for the manufacture of tubular films. Movement of the extrudate through the coating apparatus may be effected under the influence of gravity, or by conventional moving means, such as cooperating rollers, or endless belts, which engage the external surface of the extrudate to forward the latter in the desired direction.

Suitably, the support member of the coating apparatus is of any configuration defining an appropriate orifice through which the tubular extrudate may be passed in an axial direction, and conveniently is an annular member or plate containing a circular orifice of diameter slightly greater than that of the extrudate so that the latter may pass freely through the orifice without abrading against the edge thereof. The support member may be of unitary construction or may comprise a plurality of support elements arranged to provide a relatively rigid support structure or framework which serves as a base on which the respective spreading members may be mounted.

The function of the spreading members is to smear and spread an applied coating medium around the surface of the extrudate in a direction transverse to the axial direction of movement thereof, and it is preferred that the spreading members are disposed at locations regularly spaced-apart around the orifice in the support member, and thus around the periphery of the tubular extrudate. The number of spreading members employed is not critical provided there are sufficient thereof to ensure spreading of the applied medium into a continuous coating around the entire periphery of the extrudate. The number employed depends, inter alia, upon the dimensions of the tubular extrudate, and, in practice, is conveniently from 2 to 20, preferably from 6 to 12.

Each spreading member, which conveniently is of generally rectangular shape, includes a contact surface for presentation to the external surface of the tubular extrudate, and that contact surface may be planar or of appropriate curvature to conform closely to the surface of the extrudate.

Effective spreading of the applied coating medium is achieved if each spreading member assembly is of low inertia, and if each member per se is of relatively high flexibility thereby permitting the member to "track", and respond rapidly to, variations in the contour of the tubular extrudate. Preferably, therefore, each spreading member is fabricated from a resilient material of relatively low mass, such as spring steel. Radially inward flexing of a spreading member, relative to the longitudinal axis of the extrudate, may be assisted by ensuring that at least one of the circumferentially spaced-apart edges of that member is unsupported and capable of relatively unrestricted movement in a plane normal to said longitudinal axis. Conveniently, therefore, only the leading edge of each spreading member, in the direction of rotation of the assembly, is supported. Tracking of the extrudate contours may be further improved, if desired, by providing at least one, and preferably both, of the axially spaced-apart edges of a spreading member with a "neck" or indentation, preferably adjacent the supported edge of the spreading member, thereby permitting that spreading member to adopt an axially inclined position relative to the longitudinal axis of the extrudate. Axial inclination of a spreading member is particularly desirable when coating an extrudate in a transitional state between a partially collapsed and fully inflated condition—as encountered, for example, during the forwarding, by cooperating nip rolls, of a cast tubular extrudate for reheating and subsequent conversion to an oriented tubular film.

The contact surface of each spreading member presented to the tubular extrudate is suitably provided with a contact pad for direct engagement with the surface thereof, the pad being of a material capable of spreading and polishing the deposited coating medium to an acceptably uniform finish. The pad material is desirably soft, and inert to the coating medium, and should be selected so as to exhibit an acceptable life span despite the conditions encountered during the coating operation; e.g. the pad may have to operate in a relatively high temperature environment, and be subjected to a constant abrading action against the surface of the tubular extrudate. A resilient foam, such as a polyurethane foam, may be employed as the contact pad. Preferably, however, the contact pad should be of a material which does not absorb the coating medium and therefore retains its resilience and consistency when wetted by the coating medium; neither should it have a porous structure such that the coating medium will dry out to form a hard crust within the pores of the contact pad. Expanded elastomers having closed cell structures overcome this difficulty. A particularly suitable contact pad comprises a neoprene foam backing layer having adhesively bonded thereto, for engagement with the tubular extrudate, a layer of a nylon fabric.

The contact pad may be secured to the contact surface of the spreading member in any convenient manner. For example, the pad may be adhesively bonded to the contact surface, but is preferably detachably secured thereto—for example, by stud fastenings, or the like, positioned at the radially outward surface of the contact member to avoid abrasion of the extrudate surface.

The mounting means for each spreading member should be such that the latter is displaceable in a generally radially inward direction towards the axis of the extrudate and is retractable therefrom when coating of the surface of the extrudate is not required. Any suitable form of radial displacement mechanism, including a slideable assembly, may be employed, but a particularly simple and effective mounting means comprises a longitudinal mounting member pivotally attached about an intermediate point to the (annular) support member for pivotal movement in a plane substantially normal to the longitudinal axis of the tubular extrudate. An axially projecting finger or pin at or adjacent one end of each longitudinal mounting member provides a convenient support to which a spreading member may be secured—preferably detachably, to facilitate replacement thereof.

As hitherto described, better "tracking" by the spreading member and less "lift-off" of the latter from the extrudate surface is experienced if the spreading assembly is of low inertia. Preferably, therefore, the mounting member and associated components are fabricated from a material exhibiting strength and low mass, such as an aluminium alloy.

Biasing of each spreading member into an operative position for engagement with the extrudate surface may be effected in any convenient manner. For example, the aforementioned pivotal mounting member may be provided with an appropriate mass at or adjacent the end remote from the axial finger supporting the spreading member, whereby, on rotation of the entire spreading assembly, the centrifugal force acting on the mass causes sufficient pivotal movement of the mounting member to displace the spreading member to the operative position. Alternatively, and preferably, each mounting member may be resiliently biased to the operative position by suitably positioned spring means, compression or tension as appropriate, mounted on a spatially fixed base—such as the (annular) support member.

Desirably, the coating assembly includes means for retracting each spreading member from an operative position to an inoperative position in which the contact pad does not engage the extrudate surface. Independent retraction of individual spreading members may be practised, if desired, but for convenience and ease of operation it is preferred that retraction of all the spreading members is effected simultaneously. A particularly suitable device for effecting simultaneous retraction comprises an iris diaphragm positioned relative to the support member to cooperate with the respective mounting members and displace the latter against the force exerted by the biasing means, thereby disengaging the spreading members from the operative position.

The driving means for rotating the coating assembly is conveniently of a conventional kind, and may include a belt and pulley drive, or a gear wheel and pinion mechanism, coupled to a suitable prime mover, such as an electric motor.

The speed of rotation of the coating assembly in a plane substantially normal to the longitudinal axis may vary over a considerable range, the correct speed for acceptable coating performance being readily determined by simple experimentation. Conveniently, the ratio of rotational speed of the coating assembly to the axial speed of the tubular extrudate is within a range of from 2:1 to 20:1, and preferably from 5:1 to 10:1. Thus, a tubular film-forming extrudate travelling in an axial direction at a speed of some 100 mm/s is conveniently coated by a device according to the present invention rotating at a speed of the order of 700 mm/s, i.e. a ratio of 7:1.

Deposition of the coating medium onto the external surface of the tubular extrudate is effected in any convenient manner—for example, by brushing, by discharge from a suitably positioned manifold, by pumping in the form of an aerated foam, or by trickle or drip feed directly onto the contact pads of the spreading assembly. However, to avoid profile defects, e.g. in film derived from the coated extrudate, it is preferred that the coating medium is applied by a technique which avoids "point-contact" (as with fixed applicator brushes) of the medium on the extrudate surface and affords good preliminary spreading of the medium prior to contact with the spreading members. Accordingly, the coating medium is conveniently applied from a spray assembly upstream of the spreading assembly, in the direction of travel of the tubular extrudate. The spray assembly suitably comprises a plurality (e.g. four) of spray heads regularly disposed around the periphery of the tubular extrudate, these heads preferably being independently adjustable with respect to direction and velocity of delivery.

In one embodiment of the invention a recovery vessel for collecting excess coating medium is provided, suitably in the form of an annular receptacle or drip-tray located downstream of the spreading assembly. Recycling of the collected medium may be effected, if desired.

Centralising means for accurately positioning the coating assembly relative to the path of the tubular extrudate may also be provided—suitably by means of a plurality of threaded adjusters appropriately located around the periphery of the assembly.

Although, in general, coatings in flowable condition, for example—emulsions, slurries, pastes, gels and foams, are suitable for application by the technique of the present invention, we prefer, for convenience and ease of application, to employ coatings in the form of a solution or dispersion of the coating material in a liquid medium. An aqueous solution or dispersion of the coating material is particularly convenient in terms both of cost of the liquid medium, and of safety in avoiding the explosive and toxicity hazards attendant upon the use of volatile organic solvents.

The transverse spreading technique of the present invention ensures that the applied coating medium is positively spread and smoothed by the polishing action created by the tangential wiping motion of the spreading members relative to the surface of the moving extrudate. This assists the formation of a uniform coating, and avoids "flooding" of the coating medium at regions of the extrudate exhibiting surface indentations and irregularities.

To improve the spreadability of the coating medium and ensure that it remains uniformly dispersed in a continuous layer after spreading on the extrudate surface, properties such as the viscosity and surface tension of the coating medium can be adjusted to a suitable value—for example by inclusion in the coating medium of a conventional viscosity modifier, such as a water-soluble polymer, and/or an appropriate surfactant. The appropriate balance of these characteristics depends, inter alia, on the temperature of the coating environment and the rate at which the applied coating is allowed to dry, and is readily established by simple experimentation. Thus, a relatively viscous coating medium, for example—a medium having a viscosity (measured with a Brookfield Viscometer, spindle No. 6) of the order of 22,500 centipoise (10 rpm) or 5,350 centipoise (100 rpm), can be employed.

The technique of the present invention may be employed in the application of coatings of various kinds, but has proved particularly useful in the production of thermoplastic polymeric films having an electrically continuous antistatic coating on a surface thereof. For example, a coating medium comprising an aqueous solution of a quaternary ammonium compound, such as choline chloride, as antistatic agent may be employed. An amine sulphate prepared from 'Ethomeen' T12 (supplied by Armour Hess Chemicals Limited) has also proved of value as an independent antistatic agent, and additionally exhibits surfactant characteristics. Accordingly a combination of choline chloride and 'Ethomeen' T12 sulphate in aqueous solution has proved to be a particularly effective antistatic coating medium for use according to the present invention. Other antistatic agents, alone or in combination, may be employed, if desired.

The amount of amine sulphate present as the sole antistatic agent in the solution or dispersion applied to the tubular extrudate depends, inter alia, on the level of antistatic properties required in the treated product, and can be readily determined by simple experimentation. Relatively high concentrations of amine sulphate are suitable, provided that the viscosity of the solution or dispersion is not increased to a level which adversely affects the mobility and spreadability thereof, and are advantageous in that the amount of volatile vehicle, which may adversely affect the surface of the extrudate during evaporation therefrom, is kept to a minimum. In practice, the amine sulphate is conveniently employed at a concentration of up to about 60% by weight of the solution or dispersion, and is suitably employed at concentrations within a range of from 5 to 55%, preferably from 10 to 50%, by weight of the solution or dispersion. However, if the antistatic influence of the amine sulphate is supplemented by the presence of an additional additive, such as choline chloride, the concentration of the amine sulphate may be reduced to a relatively low value, for example of the order of 0.1 to 2.5%, the total concentration of the amine sulphate and the additional additive being within the aforementioned range of up to 60% by weight of the solution or dispersion. Suitably, the concentration of the amine sulphate, alone or together with a supplementary additive, is selected so as to yield a product, such as a polyolefin film derived from the coated extrudate, exhibiting a surface resistivity, measured at 50% Relative Humidity, not exceeding 10 gigohms, and preferably less than 5.0 gigohms.

In practice, we have observed that adequate surfactant behaviour is achieved by the use of a relatively small amount of a long chain amine sulphate. Such salts are less effective, weight for weight, as antistatic agents than short chain quaternary ammonium compounds, such as choline chloride, and we therefore prefer to employ a solution or dispersion comprising a major proportion of the quaternary ammonium compound and a minor proportion of the amine sulphate. Conveniently, the weight ratio of quaternary ammonium compound to amine sulphate in the solution or dispersion applied to the tubular extrudate is from 2:1 to 50:1, preferably between 3:1 and 30:1. As hereinbefore described, the combined concentration of quaternary ammonium compound and amine sulphate is desirably such, for example up to about 60% by weight of the applied solution or dispersion, that the viscosity of the solution or dispersion is not increased beyond a level at which a uniform distribution of the additives on the substrate can be achieved.

Another effective antistatic composition comprises a quaternary ammonium compound, such as choline chloride, an organic polyol, such as glycerol, and, optionally, an amine salt of the kind hereinbefore described. The composition conveniently comprises from 10 to 90 weight % of the quaternary ammonium compound, from 90 to 10 weight % of the organic polyol, and from 0 to 50 weight % of the amine salt, and may be employed at a concentration of from 1 to 50 weight % of an aqueous solution.

The amount of coating medium employed will depend, inter alia, on the application envisaged for the coated film, and on the required characteristics of the coated surface—such as coefficient of friction and/or electrical conductivity, but, in the case of an oriented polyolefin film substrate the coating medium is conveniently applied in an amount which will yield an average dry coat thickness within a range of from 0.0005 to 0.03 μm, preferably from 0.001 to 0.002 μm.

To achieve adequate spreading of the applied coating medium there should be relative transverse movement between the spreading members and axially moving tubular extrudate. In practice, this is conveniently achieved by ensuring that the tubular extrudate is non-rotatable about its longitudinal axis, in the direction of movement of the spreading members, to any significant extent during the spreading operation.

After application, and spreading, the applied coating medium may be formed into a continuous dry, adherent, coating layer on the tubular extrudate by conventional procedures—for example, by allowing the coating to dry at ambient temperature, or by passing the coated extrudate through a drying oven to evaporate the solvent or dispersant medium.

The present invention is particularly suited to the production of self-supporting coated films formed from a thermoplastic film-forming polymeric material.

By a "self-supporting" film is meant a film capable of independent existence in the absence of a supporting substrate, a polyolefin packaging film being a typical example thereof. Suitable thermoplastic film-forming polymeric materials include polycarbonates, polysulphones, polyamides such as polyhexamethylene adipamide or polycaprolactam, polyesters such as polyethylene terephthalate and polyethylene-1,2-diphenoxyethane-4,4'-dicarboxylate, vinyl polymers and copolymers, and polymers and copolymers of 1-olefins such as ethylene, propylene, butene-1,4-methylpentene-1. A preferred material is a high molecular weight stereoregular predominantly crystalline polymer of propylene, either in the form of a homopolymer or copolymerised with minor quantities (e.g. up to 15% by weight of the copolymer) of other unsaturated monomers, such as ethylene.

An oriented tubular film is suitably produced by melt extruding the desired polymeric material in tubular form from a simple annular die, cooling the extruded tube, reheating and inflating the tube by the so-called "bubble" process to introduce transverse orientation, and simultaneously elongating the tube longitudinally to orient the film in a lengthwise direction. The film is then preferably "heat-set", i.e. dimensional stability of the film is improved by heating the film, while restrained against thermal shrinkage, to a temperature above the glass transition temperature of the polymer from which the film is formed but below the melting point thereof.

A similar technique employing a multi-channel, annular, coextrusion die is suitable for the production of multiple-layer films, such as a polypropylene substrate having on at least one surface thereof a layer of a copolymer of propylene (80 to 95% by weight) with another alpha-olefin containing from 4 to 10 carbon atoms, such as butene-1.

In the production of a coated film according to the invention, the coating medium is conveniently deposited and spread on a surface of the cast, unoriented tubular extrudate immediately prior to the reheating and orienting stage of the film-forming process. Drying of the coating, for example—by evaporation of the volatile solvent or dispersant, is therefore effected during the reheating operation, and the dried coating layer becomes firmly bound to the film surface during orientation.

Coated films made according to the present invention may contain any of the additives conventionally employed in the production of thermoplastic films, and may be subjected to conventional after-treatments—for example, exposure to a corona discharge treatment to improve the bonding and print-receptive characteristics of the film surface.

Films made according to the present invention may vary in thickness depending on the intended application, but usually we find that films having a thickness of from 2 to 150 microns are of general utility. Films intended for use in packaging operations are suitably within a thickness range from 10 to 50 microns.

DETAILED DESCRIPTION OF THE DRAWINGS

Figure 1:
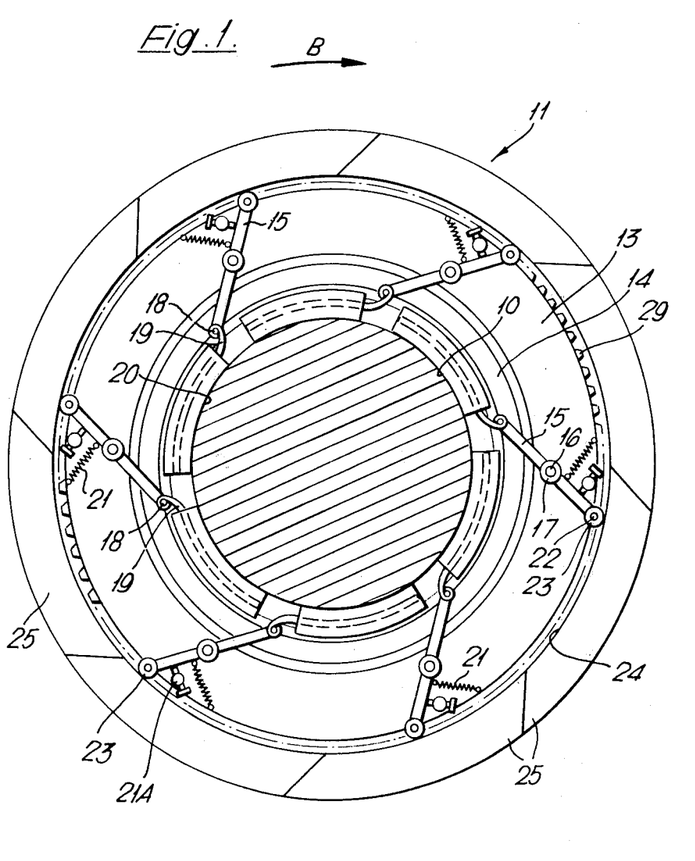
FIG. 1 is a schematic plan view of a rotary spreading assembly with six circumferentially spaced-apart spreading members.
Figure 2:
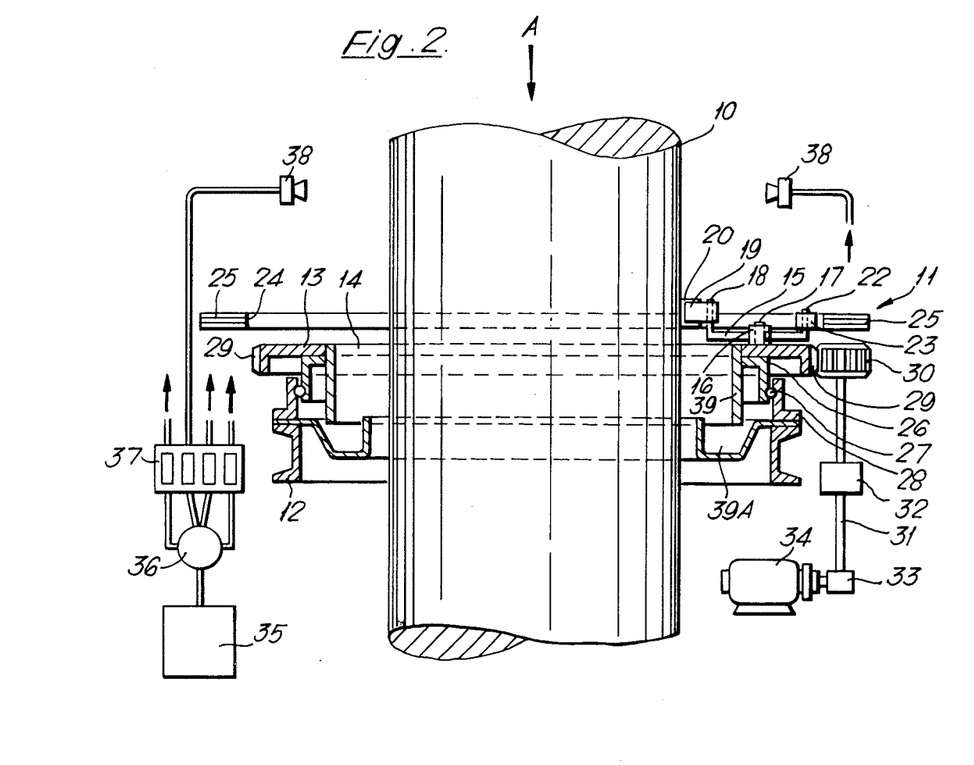
FIG. 2 is a simplified schematic elevation of the spreading assembly including only one of the six spreading members and associated mountings.

Referring to FIGS. 1 and 2 of the drawings, a tubular extrudate 10 travelling in the longitudinal axial direction represented by arrow A passes through a transverse spreading assembly, generally designated 11, supported on a rigid framework of girders 12.

The spreading assembly includes an annular support member or plate 13 defining a circular orifice 14 or diameter exceeding that of the tubular extrudate.

Circumferentially spaced-apart around support member 13 are six longitudinal mounting members or arms 15, each of which includes a central boss 16 to receive a pin 17 projecting upwardly from the support member thereby permitting pivotal movement of each arm in a plane substantially normal to axis A.

An axially projecting finger or pin 18 at the radially innermost end of each arm supports a generally rectangular and slightly curved spring steel spreading member 19, the innermost or contact surface of which is covered by a resilient contact pad 20.

Biasing means in the form of individual tension coil springs 21 secured to annular support plate 13 and linked to the outermost limb of the respective mounting arms, pivotally urges the latter against an adjustable stop assembly 21A, and into the operative position, illustrated in FIGS. 1 and 2, in which the respective contact pads engage the external surface of tubular extrudate 10. Effectively, therefore, each coil spring pulls a mounting arm into engagement, in a stationary position, with the associated stop assembly, and does not directly influence the pressure exerted by the contact pad on the extrudate surface, the degree to which each contact pad engages the extrudate surface being finely controlled by adjustment of the relevant stop assembly.

Located on an axially projecting pin 22 at the outermost extremity of each mounting arm is a roller 23, each of the respective rollers cooperating with the periphery of aperture 24 in an iris plate diaphragm 25. Simultaneous retraction of the six contact pads to an inoperative position (not shown) is readily effected by reducing the aperture of the diaphragm, the plates of which engage rollers 23 and cause each mounting arm to pivot against the bias force exerted by springs 21.

Referring particularly to FIG. 2, annular support plate 13 is mounted on a cylindrical inner bearing housing 26 which is freely rotatable, on a roller bearing assembly 27, relative to cooperating bearing support housing 28, the latter being rigidly secured to framework 12.

Clockwise rotation (arrow B, FIG. 1) of support plate 13, and associated spreading mechanism, in a plane substantially normal to axis A is effected by a drive mechanism comprising annular, toothed gear wheel 29 secured to plate 13 and cooperating with toothed gear pinion 30 on shaft 31, the latter being linked through conventional gear box 32 and coupling assembly 33 to electric motor 34. Desirably, for safety reasons, the support plate drive assembly is interlocked with that to the iris diaphragm. The latter drive system is preferably responsive to changes in the pressure of inflating gas within the extrudate so that in the event of the film "bubble" bursting the diaphragm immediately operates to retract the spreading members which otherwise, while continuing to rotate, would tend to twist the ruptured extrudate into contact with the downstream heater bank 64, 65 (FIG. 6), thereby creating a fire hazard on the plant.

In operation, liquid coating medium is transferred from reservoir 35 by pump 36 through a flow meter assembly 37, and thence to four spray heads 38 (only two shown) symmetrically disposed around the path of the tubular extrudate at a short distance (e.g. a few centimeters) upstream of the rotary spreading assembly. Coating medium discharged from heads 38 onto the tubular extrudate is subsequently spread and merged into a uniform, continuous coating on the tubular surface by the polishing action of the contact pads 20 of the rotating spreading assembly.

Surplus coating medium, if any, which may be thown clear by centrifugal action is diverted by cylindrical splash-guard 39 into annular drip-tray 39A, from which it may be recycled, if desired, to reservoir 35.

Figure 3:
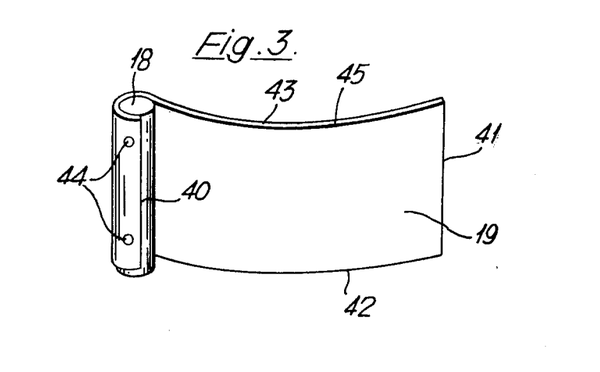
FIG. 3 is a perspective view of a spreading member.

The spreading member illustrated in greater detail in FIG. 3 comprises a spring steel plate 19 of generally rectangular shape with circumferentially spaced-apart edges 40, 41 and axially spaced-apart edges 42, 43, the leading edge 40 being fashioned to fit around projecting pin 18 (on mounting arm 15—not shown) to which the plate is releasably secured by fixing screws 44. The contact surface 45 of the plate is of slightly concave curvature to accommodate the tubular extrudate to which it is presented in operation of the coating assembly.

Figure 4:
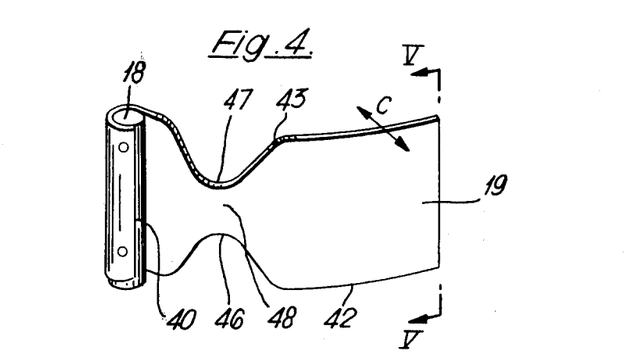
FIG. 4 is a perspective view of a modified spreading member.

The spreading member of FIG. 4 is similar to that of FIG. 3 apart from the provision of an indentation 46, 47 in each of the axially spaced-apart edges 42, 43, adjacent the leading edge 40, to improve axial flexibility of the member about neck 48, as indicated by arrow C.

Figure 5:
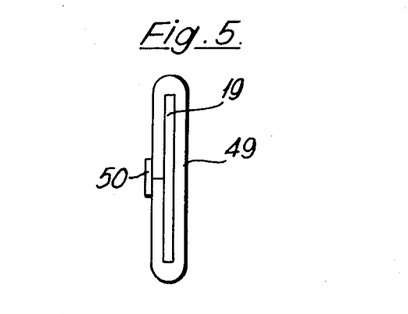
FIG. 5 is an end section along the line V—V of FIG. 4 with the addition of a contact pad.

As illustrated in FIG. 5, a contact pad 49 comprising a generally rectangular sheet of a soft, resilient material such as a neoprene rubber foam, surfaced with a layer of nylon fabric for engagement with the surface of the tubular extrudate, is folded over about spring steel plate 19 and releasably secured at the radially outward surface thereof by stud fastener 50 (for other appropriate fastening means).

Figure 6:
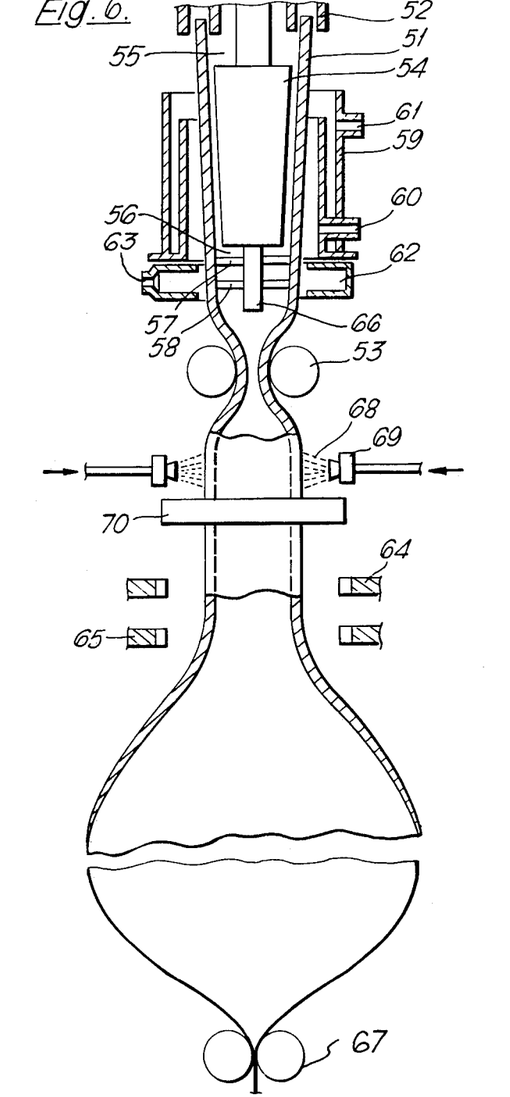
FIG. 6 is a schematic elevation depicting the application of a coating medium to a quenched tubular extrudate during the production of an oriented polymeric film.

Referring to FIG. 6, which depicts a film-forming apparatus employing a lubricated mandrel of the kind particularly suitable for the production of polyolefin films, a tube of thermoplastic material 51 is shown being extruded from an annular extrusion die 52. The tube is withdrawn from the extrusion die by a pair of contra-rotating nip rolls 53 which are of width less than the collapsed tube. The rolls 53 withdraw the tube at a rate greater than that at which it is extruded, thus hauling the tube down on to a cooling mandrel 54 situated inside the tube, and forwarding the cooled tube for further treatment. Water is supplied to between the tube and the mandrel by maintaining a small head of water in the space 55 at the top of the mandrel. Water is therefore carried down between the mandrel 54 and the tube 51 into the space 56 formed between the bottom of the mandrel and a resilient sealing member 57. Water is removed from this space through a pipe (not shown) which passes through the centre of the mandrel.

Below sealing member 57 is positioned a circular sponge 58 which contacts the inside of the tube 51 to remove any moisture which passes the seal. This moisture is removed from the sponge 58 by applying vacuum through a suction pipe (not shown).

In practice an intermediate sealing member is usually positioned between sealing member 57 and sponge 58 together with means to pressurise the tube in this region, and to control the extent to which water from space 56 penetrates between the mandrel and the tube, but these details are omitted for clarity.

As well as being cooled internally, the tube 51 is cooled externally by passage through a water bath 59 which surrounds the tube. Water is continually introduced into the water bath through pipe 60 and flows out through pipe 61. After passing through the water bath, the tube passes through a chamber 62 where vacuum is applied through pipe 63 to remove moisture from the outside of the tube.

The cooled tube then passes through the pair of nip rolls 53 which control the speed at which the tube is travelling, and through banks of infra-red heaters 64 and 65 which raise the temperature of the tube to that required for stretching. The tube is then stretched in the direction transverse to its direction of extrusion by air under pressure introduced through pipe 66 to inflate the tube, and is simultaneously stretched longitudinally by a pair of nip rolls 67 which collapse, and form an airtight seal across, the inflated tube, and withdraw the collapsed tube at a rate greater than that at which the extruded tube is withdrawn from the extrusion die by the nip rolls 53.

Coating of the extruded tube is effected by a coating assembly of the kind illustrated in FIGS. 1 and 2, located between nip rolls 53 and infra-red heater 64. Thus, a cloud of coating medium 68, discharged onto the tube surface from four circumferentially spaced-apart spray heads 69 (only two shown), is spread and polished around the tube surface, by a rotating spreading assembly, generally designated 70.

The applied, polished, coating is then dried by passage of the coated tube, through infra-red heaters 64 and 65.

The invention is further illustrated by reference to the following Examples.

EXAMPLE 1

Using a tubular film-forming apparatus generally of the kind depicted in FIG. 6 a composite triple-layer tube, having a polypropylene core with a layer of a propylene-butene-1 copolymer on each surface thereof, was extruded downwardly at a rate of 280 kg/hour, the tube travelling at a speed of 11.84 meters/minute, and was cooled by means of the internal quenching mandrel 54 and external water bath 59. The resulting cast tube, having a diameter of about 152 mm (6 inches) and wall thickness of about 0.94 mm (0.037 inch), was forwarded by nip rolls 53 through infra-red heaters 64, 65, and inflated to form a bubble, the peripheral speed of draw rolls 67 being controlled to yield a biaxially oriented tubular film exhibiting a draw ratio of about 7:1 in each of the longitudinal and transverse direction, and having a thickness of about 20 μm. The tubular film was then slit to form a flat film which was heat-set on a system of matt-surfaced, hot rollers of the kind described in British Pat. No. 1,124,886.

A spreading assembly, similar to that depicted in FIGS. 1 and 2, having 6 resilient spreading members each faced with a contact pad (6 mm thick) of an expanded neoprene backing layer with a nylon cloth contact layer engaging the tube surface, was located between nip rolls 53 and the infra-red heater bank 64, 65 of FIG. 6.

An aqueous solution comprising 3.0 wt % choline chloride, 0.2 wt % 'Ethomeen' T12 sulphate [prepared by reacting an aqueous solution of 'Ethomeen' T12 (Armour Hess Chemicals Limited) with concentrated sulphuric acid], and 96.8 wt % water, was sprayed onto the cast tube upstream of the assembly, from four symmetrically spaced spray heads 38, at a total rate of 9 ml/minute, and spread around the tube surface by means of the spreading assembly which was rotated at a speed of 90 rpm.

After orienting, slitting and heat-setting, two films, each of width approximately 1670 mm, were derived from the coated tube. The surface conductivity of each film was measured, immediately after manufacture, at twelve positions uniformly spaced across the coated surface of the film by means of a simple apparatus comprising a DC power supply of 70 volts in series with an electronic microammeter and with an electrode assembly comprising a pair of knife edged electrodes each of 100 mm length and spaced-apart in parallel by a distance of 0.25 mm. To measure surface conductivity of the film, the electrode assembly was placed on the film at the desired position thereby completing an electrical circuit through the apparatus. The conductivities recorded by the microammeter provided an indication of the effectiveness of the applied coating in the area under test.

The surface conductivities (in units of $10^{-12}$ mhos per square) recorded at 44% Relative Humidity at each of the twelve positions on each film sample are recorded in the following Table.

Table

| Position | Surface Conductivity | |
|---|---|---|
| | Sample A | Sample B |
| 1 | 200 | 100 |
| 2 | 180 | 120 |
| 3 | 380 | 180 |
| 4 | 300 | 300 |
| 5 | 240 | 160 |
| 6 | 200 | 140 |
| 7 | 100 | 180 |
| 8 | 160 | 160 |
| 9 | 240 | 100 |
| 10 | 300 | 70 |
| 11 | 240 | 80 |
| 12 | 200 | 70 |
| Average | 228 | 138 |

These results demonstrate the uniformity and reproducibility of the coating on the film which was of perfect optical appearance and exhibited desirable heat-sealing characteristics.

Samples of a biaxially oriented, vinylidene chloride/acrylonitrile copolymer-coated, polypropylene film prepared on a similar unit, but not coated with an aqueous solution of choline chloride/'Ethomeen' T12 sulphate, exhibited surface conductivities, measured by the aforementioned test method, of the order of 20 picomhos/square.

EXAMPLE 2

The procedure of Example 1 was repeated save that the antistatic coating solution additionally contained glycerol, the coating solution comprising 3.2 wt % choline chloride, 4.2 wt % glycerol, 0.2 wt % 'Ethomeen' T12 sulphate and 92.4 wt % water.

As in Example 1, two films were derived from the coated tube. The mean surface conductivities (in units of $10^{-12}$ mhos per square) recorded at 37% Relative Humidity at 24.5° C. at each of twelve positions uniformly spaced across the coated surface of each film immediately after manufacture are recorded in the following Table.

Table

| Position | Surface Conductivity | |
|---|---|---|
| | Sample A | Sample B |
| 1 | 300 | 150 |
| 2 | 300 | 200 |
| 3 | 350 | 250 |
| 4 | 400 | 300 |
| 5 | 350 | 300 |
| 6 | 300 | 250 |
| 7 | 250 | 300 |
| 8 | 250 | 200 |
| 9 | 200 | 250 |
| 10 | 200 | 200 |
| 11 | 180 | 250 |
| 12 | 170 | 160 |
| Average | 271 | 259 |

These results again demonstrate the uniformity and reproducibility of the coating on the film which was of perfect optical appearance and exhibited desirable heat-sealing characteristics.

We claim:

1. Apparatus for producing a coated film comprising an annular die having an orifice and for extruding a tubular extrudate of a thermoplastic polymeric material, means for cooling the tubular extrudate, means for withdrawing and axially forwarding the cooled extrudate, means for reheating and inflating the withdrawn extrudate to form an oriented tubular film, and means for coating the extrudate by spreading a coating medium substantially circumferentially around the periphery thereof, said coating means positioned between said forwarding means and said reheating means and comprising dispensing means for supplying a liquid coating medium to the external surface of the cooled extrudate, a rotatable assembly including a support member providing an orifice through which the tubular extrudate may be fed in an axial direction, a plurality of spreading members spaced-apart from each other around the circumference of the support member orifice, mounting means for each of the spreading members, said mounting means being operatively associated with the support member and displaceable relative thereto, means for biasing each of the spreading members inwardly of the support member for engagement with the external surface of the tubular extrudate, and drive means for rotating the assembly in a plane substantially normal to said axial direction.

2. Apparatus according to claim 1 wherein said coating means includes a stop assembly engageable with said mounting means to control the pressure exerted by each spreading member on the tubular extrudate.

3. Apparatus according to claim 1 wherein said coating means includes retracting means for simultaneously disengaging the spreading members from the surface of the tubular extrudate.

4. Apparatus according to claim 1 wherein said dispensing means comprises a spray assembly for discharging a solution or dispersion of a liquid coating medium onto the tubular extrudate upstream of the rotatable assembly.

5. Apparatus according to claim 1 wherein each spreading member is supported at the leading edge thereof.

6. Apparatus according to claim 1 including a resilient contact pad on the surface of each spreading member.

7. A method of producing a coated film by depositing a coating medium on the surface of an axially moving cooled thermoplastic polymeric tubular extrudate and reheating and inflating the coated extrudate to form an oriented, coated tubular film comprising the step of substantially circumferentially spreading the deposited coating medium onto the surface of the extrudate, prior to reheating and inflating, by successive contact of the deposited coating medium with each of a plurality of spreading members resiliently biased into engagement with said surface and rotating around the periphery of the extrudate in a common plane substantially normal to the longitudinal axis of said tubular extrudate.

8. A method according to claim 7 wherein the ratio of the rotational speed of the spreading members to the axial speed of the tubular extrudate is from 2:1 to 20:1.

9. A method according to claim 7 wherein the coating medium is an aqueous solution of an antistatic agent.

10. A method according to claim 7 wherein the tubular extrudate comprises at least one layer of a high molecular weight stereoregular predominantly crystalline polymer of propylene.

* * * * *